United States Patent
Kong et al.

(10) Patent No.: US 11,176,131 B2
(45) Date of Patent: Nov. 16, 2021

(54) PARALLEL PROCESSING OF QUERIES WITH INVERSE DISTRIBUTION FUNCTION

(71) Applicant: Oracle International Corporation, Redwood Shores, CA (US)

(72) Inventors: Qingyuan Kong, Union City, CA (US); Huagang Li, San Jose, CA (US); Sankar Subramanian, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 197 days.

(21) Appl. No.: 16/449,382

(22) Filed: Jun. 22, 2019

(65) Prior Publication Data

US 2019/0310983 A1 Oct. 10, 2019

Related U.S. Application Data

(62) Division of application No. 15/375,023, filed on Dec. 9, 2016, now Pat. No. 10,366,082.

(51) Int. Cl.
*G06F 16/2453* (2019.01)
*G06F 16/242* (2019.01)
(Continued)

(52) U.S. Cl.
CPC ...... *G06F 16/24537* (2019.01); *G06F 16/244* (2019.01); *G06F 16/24532* (2019.01); *G06F 16/285* (2019.01); *G06F 16/35* (2019.01)

(58) Field of Classification Search
CPC .............. G06F 16/285; G06F 16/244; G06F 16/24532; G06F 16/24537; G06F 16/283; G06F 16/35; G06F 16/245
(Continued)

(56) References Cited

U.S. PATENT DOCUMENTS 7,203,694 B2 * 4/2007 Gwizdaloski ......... G06F 40/177
7,480,646 B2 * 1/2009 Cunningham ...... G06F 16/2246
(Continued)

OTHER PUBLICATIONS

Kong, U.S. Appl. No. 15/375,023, filed Dec. 9, 2016, Office Action, dated Nov. 15, 2018.
(Continued)

*Primary Examiner* — Dangelino N Gortayo
(74) *Attorney, Agent, or Firm* — Hickman Becker Bingham Ledesma LLP

(57) ABSTRACT

Techniques are described for parallel processing of database queries with an inverse distribution function by a database management system (DBMS). To improve the execution time of a query with an inverse distribution function, the data set referenced in the inverse distribution function is range distributed among parallel processes that are spawned and managed by a query execution coordinator process (QC), in an embodiment. The parallel executing processes sort each range of the data set in parallel, while the QC determines the location(s) of inverse distribution function values based on the count of values in each range of the data set. The QC requests the parallel processes to produce to the next stage of parallel processes the values at the location(s) in the sorted ranges. The next stage of parallel processes computes the inverse distribution function based on the produced values. Techniques are also described for parallel executing of queries that may additionally include another inverse distribution function, one or more non-distinct aggregate functions and one or more distinct aggregate functions.

20 Claims, 7 Drawing Sheets

(51) Int. Cl.
*G06F 16/28* (2019.01)
*G06F 16/35* (2019.01)

(58) Field of Classification Search
USPC .................................. 707/769, 692, 759
See application file for complete search history.

(56) References Cited

U.S. PATENT DOCUMENTS

| | | |
|---|---|---|
| 9,189,489 B1 | 11/2015 | Harada |
| 9,313,340 B1 | 4/2016 | Cawson |
| 9,633,073 B1* | 4/2017 | Allen .................... G06F 16/221 |
| 9,898,515 B1 | 2/2018 | Avagyan |
| 2002/0059203 A1 | 5/2002 | Witkowski |
| 2004/0034616 A1 | 2/2004 | Witkowski |
| 2007/0168336 A1* | 7/2007 | Ransil .................... G06F 16/958 |
| 2010/0145970 A1* | 6/2010 | Gorti ................ G06F 16/24534 |
| | | 707/759 |
| 2012/0290700 A1* | 11/2012 | Li ....................... H04L 61/2007 |
| | | 709/223 |
| 2012/0296934 A1* | 11/2012 | Carpenter ............. G06F 16/248 |
| | | 707/769 |
| 2013/0110793 A1 | 5/2013 | Chavda |
| 2018/0165335 A1 | 6/2018 | Kong et al. |

OTHER PUBLICATIONS

Kong, U.S. Appl. No. 15/375,023, filed Dec. 9, 2016, Notice of Allowance, dated Mar. 15, 2019.
Kong, U.S. Appl. No. 15/375,023, filed Dec. 9, 2016, Interview Summary, dated Feb. 19, 2019.

* cited by examiner

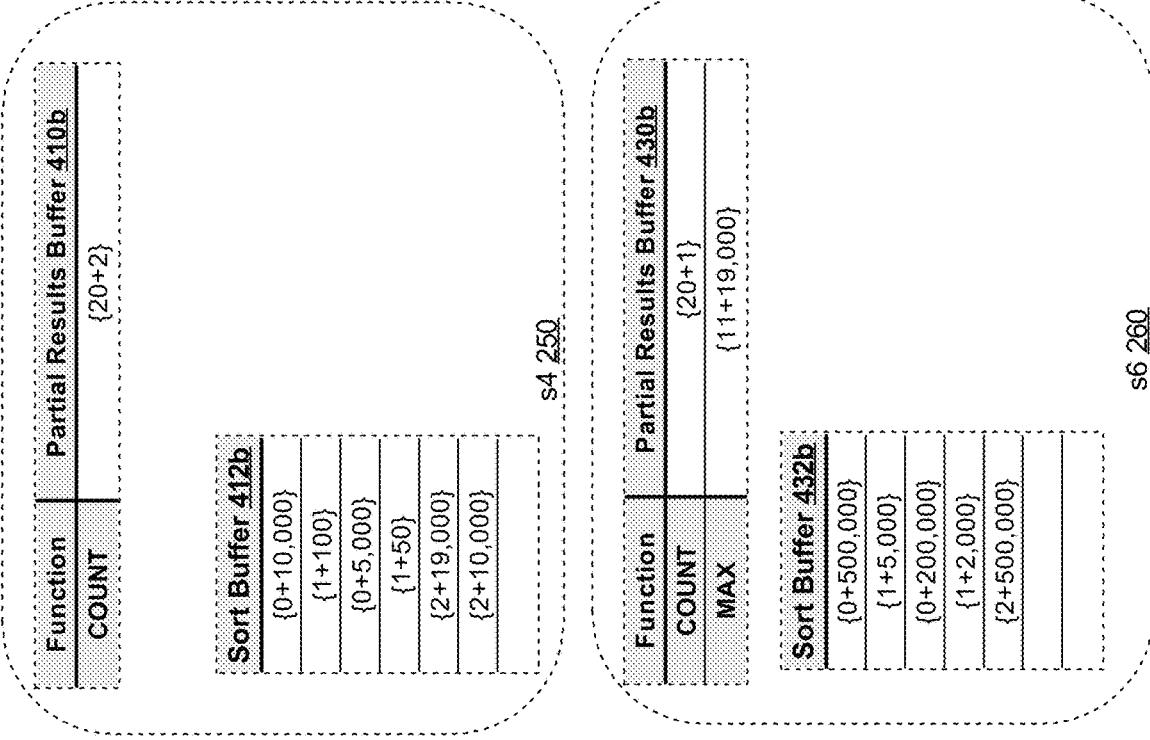

PARALLEL PROCESSING OF QUERIES WITH INVERSE DISTRIBUTION FUNCTION

BENEFIT CLAIM

This application claims the benefit, under 35 U.S.C. § 120, as a divisional of U.S. patent application Ser. No. 15/375,023, filed Dec. 9, 2016, the entire contents of which is hereby incorporated by reference as if fully set forth herein. The applicant(s) hereby rescind any disclaimer of claim scope in the parent application or the prosecution history thereof and advise the USPTO that the claims in this application may be broader than any claim in the parent application.

FIELD OF THE INVENTION

The present invention relates generally to database management systems and more particularly to parallel processing of database queries with inverse distribution functions.

BACKGROUND

Distribution functions are widely used in analytical queries of data sets. In particular, a distribution function may be used to determine a data value that corresponds to a desired percentile in the distribution of values in the data set. An inverse distribution function for a data set takes a percentile value and a sort specification, and returns a data value that would fall into that percentile value when the data set is arranged according to the sort specification. Thus, to determine the data value in the data set, the data set is sorted according to the sort specification, and the location(s) in the sorted data set that correspond to the specified percentile value are computed. When a discrete distribution is assumed, the returned data value of the function corresponds to an actual value at the computed location. Meanwhile, when a continuous distribution is assumed, the returned value may be calculated based on values at or adjacent to the computed locations.

Regardless of the distribution assumed, to compute the location(s), the inverse distribution function has to perform a scan and sort operation for ordering values in the data set according to the sort specification. Such a scan and sort operation, particularly on a large data set, may consume substantial resources and may take substantial time to execute.

Furthermore, scanning or sorting a data set using a single process is not scalable. For example, as the data set grows the sorting (even using most efficient sort algorithms) will take longer time. One solution to reduce the sort time and save resources is to parallelize the sort operation by chunking the data set into subsets and assigning a separate process to execute a sort operation on each subset of data. However, to determine the locations of data values corresponding to the specified percentile in the sorted subsets, the function needs to consider the whole data set. Thus, either the data set has to be recombined for a full sort of the data set, or complex inter-process communication has to occur between the processes sorting the subsets in order to determine the resultant data value corresponding to the specified percentile.

Furthermore, the computation of a percentile function is further complicated when the splitting of data set for parallelization cannot be readily derived from the query itself. When a query specifies a "group by" clause, the queried data set can be split based on the values of the column specified in the group by clause. But when no group by clause exists in the query, the percentile function is to be applied on the whole data set, as a single set, and parallelizing the execution of the percentile function becomes challenging.

The problem of evaluation of a percentile function, in a scalable manner, is even further complicated when a query contains multiple percentile functions on different columns. Or in addition to percentile functions, a query further contains distinct aggregate or non-distinct aggregate functions. Separate execution of these additional functions would further exacerbate the execution time of such queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures:

FIGS. 4A-4C are block diagrams that depict the buffers for slave processes that parallel execute a query in parallel, in an embodiment

DETAILED DESCRIPTION

Figure 1:
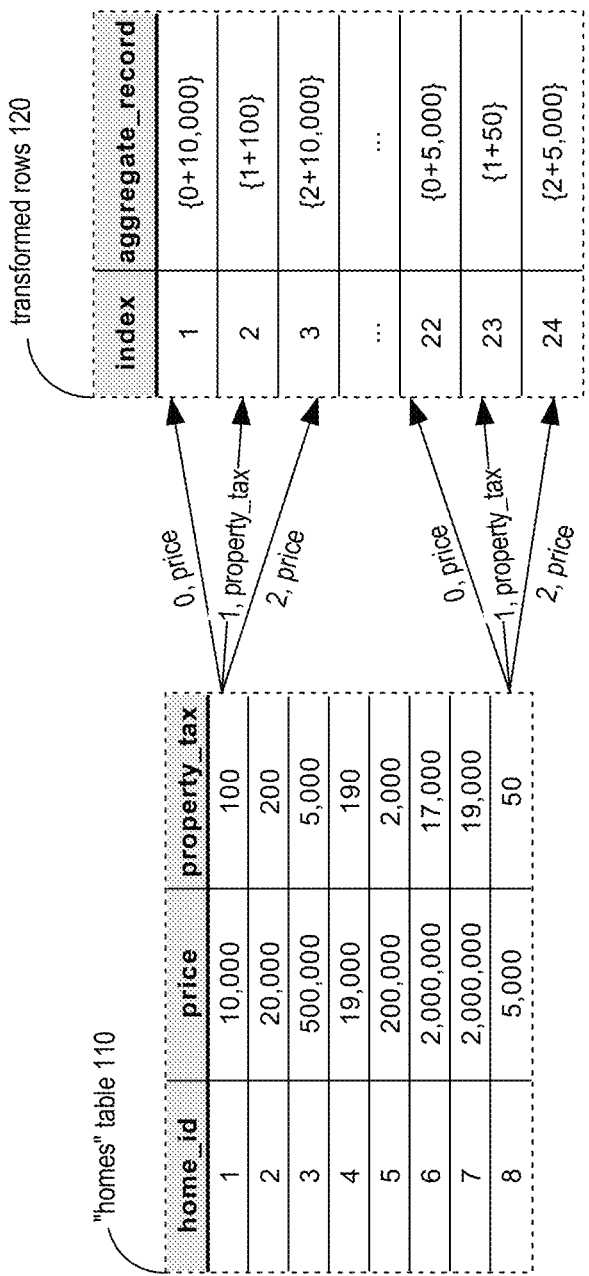
FIG. 1 is a block diagram that depicts pivoting rows of a data set, in an embodiment.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

In parallel processing, multiple processes work together simultaneously to run a query. By dividing the work among multiple processes, a database management system (DBMS) runs the query statement substantially more quickly.

In an embodiment, a DBMS may manage the parallel execution of one or more operators of a query execution plan using a query execution coordinator process (QC) and multiple parallel slave processes. Among other tasks, the query coordinator process examines each parallel operation in an execution plan and determines how the rows operated on by each parallel operation should be divided or redistributed among the parallel slave processes. The parallel slave processes then execute the parallel operation subtasks assigned by the query coordinator.

The query may contain one or more functions, such as an inverse distribution function. The column specified in the function, and on which values the function is to be computed, is referred herein as a "measure column."

In an embodiment, to execute operators to compute a percentile value for an inverse distribution function specified in a query, one or more of the slave processes range distributes rows of the data set of the measure column among the parallel slave processes. Each parallel slave process sorts the range of rows distributed to it and communicates with the QC regarding the count of the sorted rows. Based on the counts received, the QC computes the location of the rows that have column values for computing the percentile.

Since each of the parallel slave process has a particular range of values of the measure column, there is no need for complex inter-process communication to shuffle values back and forth between the slave processes. Once the received subset of range distributed rows are sorted by the slave parallel process on the measure column, the sorted subset represents a contiguous segment of the distribution for the measure column values. Thus, once the QC has knowledge on all the contiguous segments of the distribution for the measure column, the QC can determine the location of the column values necessary to compute the percentile value.

Furthermore, any slowdown in processing of an inverse distribution function due to a larger data set may be improved by simply increasing the number of parallel slave processes. According to the approach, the serial operations (range distribution, QC communication and computation) are non-sort operations and, as such, do not substantially depend on the size of the data set being processed. The sort operation, for which execution time substantially depends on the size of the data set, may be scaled by increasing the number of ranges into which to split the data set and increasing the number of parallel processes that are needed to execute the sort operation.

For queries, which contain multiple inverse distribution or other functions on different measure columns, multiple sort operations are to be performed to execute those functions. When these multiple sort operations are executed serially one sort operation after another, even if each of them is executed in parallel, the overall execution time of the queries may increase.

In an embodiment, instead of performing multiple sort operations for each function that requires a sort on a measure column, the multiple measure columns are transformed into a single column of values on which the sort operation is performed by parallel slave processes. In an embodiment, a single new column is created by arranging the rows of measure column values in a column. Stated differently, a new column is generated by "pivoting" rows of measure column values into a new single column. To keep the differentiation between values of the different measure columns, each of the values may be prefixed by a prefix corresponding to a measure column. The prefix corresponding to a measure column is referred herein as an "aggregation code" and the values in the single new column are referred herein as "aggregation records." In a related embodiment, in addition to generating aggregation records, the rows in the source table corresponding to each of aggregation record are duplicated in the transformed data set.

FIG. 1 is a block diagram that depicts pivoting rows of a data set in response to receiving a query that includes a distinct aggregate function on the "price" measure column and inverse distribution functions on the "price" and "property_tax" measure columns of "homes" table 110 (such as query Q1 described below), in an embodiment. Transformed rows 120 are generated by pivoting each row in "homes" table 110. For example, the row corresponding to the value of 1 in the "home_id" column is pivoted into three rows: one row for the "property_tax" measure column and two rows for the "price" measure column. The "price" measure column is pivoted twice because the measure column is used in two different types of functions that may need different sort operations (one function may require distinct sort operation and the other function on the same column may require general non-distinct sort operation). As a result of pivoting, the "aggregation_record" column in 120 is a single column that contains all the measure column values and can be sorted to produce the same result as sorting each individual measure column.

When aggregation records, rather than the actual measure column values, are sorted by parallel slave processes, the sorted aggregation records result in being grouped by their respective prefixes, aggregation codes, in an embodiment. Thus, the sorted values of each measure column are grouped by the aggregation codes as part of the sorted aggregation records. The function to be applied on an aggregation record may be encoded in the aggregation codes of the aggregation record. In another embodiment, slave processes and/or the QC of the slave processes maintain the mapping between aggregation codes and functions, and the functions are computed by transforming the aggregation records back into the measure columns of the functions.

Parallel Processing

Figure 2:
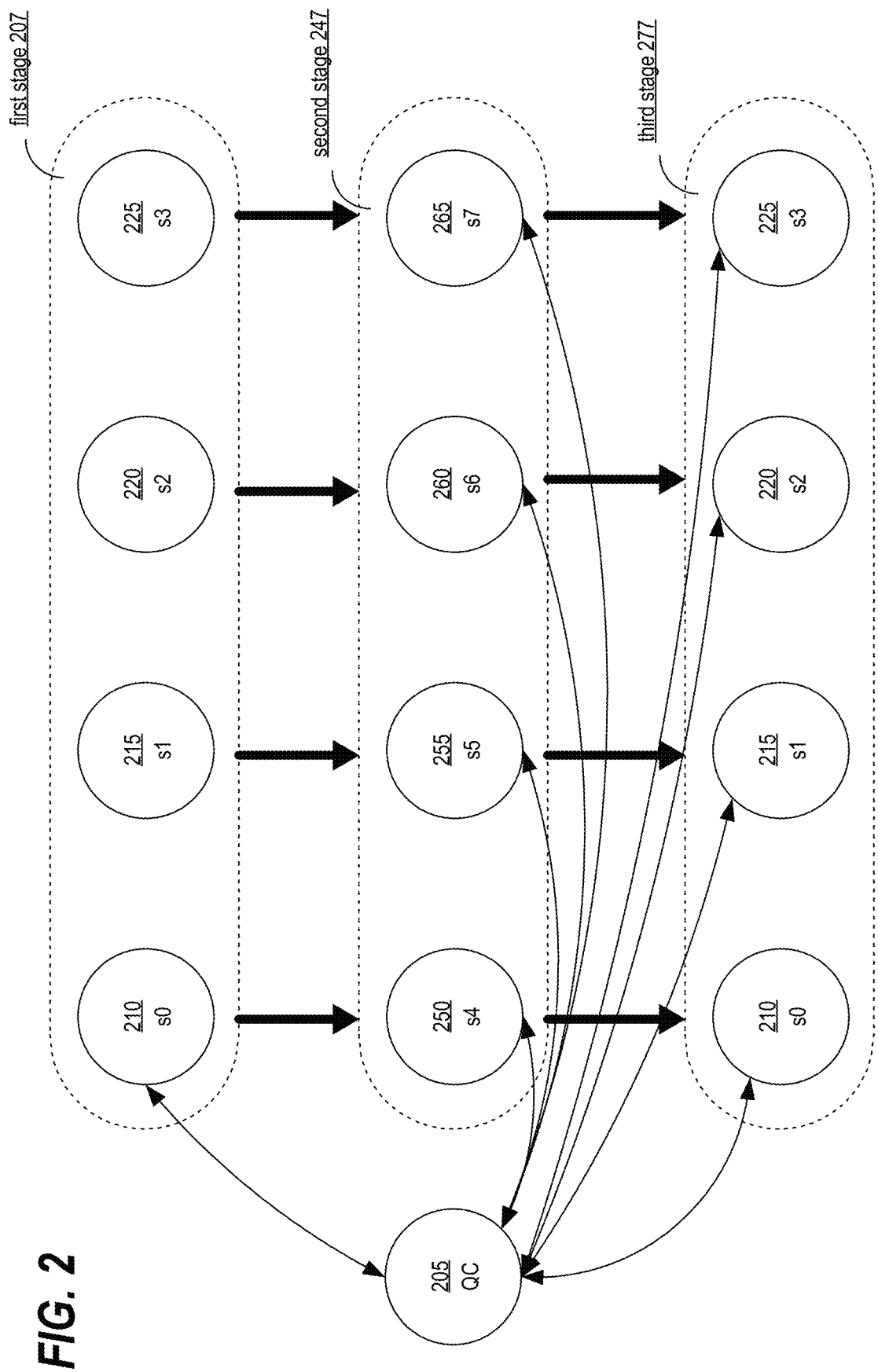
FIG. 2 is a block diagram that depicts a parallel processing of an execution plan of a query, in an embodiment.

A DBMS may use parallel processing to execute an execution plan selected for a query. FIG. 2 depicts a parallel processing of an execution plan, in an embodiment. The DBMS executes the execution plan in the context of QC 205. QC 205 manages the execution of operators in the plan, while slave processes 210-265 actually execute the operators. The slave processes are spawned by QC 205 itself to execute the operators in parallel. Spawning of processes refers to either generating new processes in the operating system of the DBMS or obtaining a process from a pool of processes reserved for execution of queries in the DBMS. QC 205 communicates with the spawned slave processes to manage the execution of the operators in the execution plan of the query.

In an embodiment, the number of slave processes spawned for an execution of a query depends on a degree of parallelism that a DBMS supports and is configured. In another embodiment, a DBMS determines the degree of parallelism based on a query to process and resources available for the processing. A higher degree of parallelism causes a higher number of slave processes to be spawned. Since the QC that has spawned slave processes needs to coordinate the work done by the slave processes, more slave processes may cause more coordination work performed by the QC. Accordingly, the QC may consume compute resources that otherwise could have been used by the slave processes to perform the work for the query execution. Therefore, the degree of parallelism supported and/or selected for the DBMS may depend on the compute resources available to the DBMS and the type of work performed by the slave processes for a query. However, the methodology for selecting the optimal degree of parallelism for the DBMS is not critical to the techniques described herein.

Once slave processes are spawned, the QC communicates with the slave processes, by delivering and receiving messages through an inter-process communication. Additionally or alternatively, the slave process may communicate amongst themselves through an inter-process communication. Various approaches may be used to implement interprocess communication in a DBMS such as shared storage or socket based communication.

Continuing with FIG. 2, according to the embodiment depicted in FIG. 2, the DBMS is performing parallel processing with the degree of parallelism of 4. Thus, QC 205 spawns 4 slave processes s0 210, s1 215, s2 220 and s3 225. QC 205 examines operators in an execution plan to determine whether an operator should be performed by a single slave process and thus, sequentially, or by multiple slave processes and thus, in parallel. For example, in FIG. 2, QC 205 determines that only a single process, s0 210, is needed to execute an operator in the execution plan at first stage 207. The QC 205 communicates to s0 210 to execute the operator, while s1 215, s2 220 and s3 225 are idling at first stage 207.

In an embodiment, in the next stage, the QC determines that an operator is to be executed in parallel, and, thus, the data set for the operator is to be divided/distributed among the parallel slave processes. For this further parallel processing, the QC spawns another set of slave processes in the same degree of parallelism. In such arrangement, the original set of processes that produced the data sets for the operator are referred to as "producers", while the next stage slave processes are referred as "consumers" because the next stage slave processes consume the produced data set.

Continuing with the embodiment depicted in FIG. 2, QC 205 spawns another set of 4 slave consumer processes: s4 250, s5 255, s6 260 and s7 265 at second stage 247. The consumer slave processes receive data sets from producers s0 210, s1 215, s2 220 and s3 225 (depicted by thick lines between first stage processes 207 and second stage process 247) for further parallel processing. QC 205 communicates with the second stage 247 processes (depicted by thin lines between QC 205 and s4 250, s5 255, s6 260, and s7 265) to coordinate the execution of operators for processing of the produced data sets.

In an embodiment, the same slave processes may be both a consumer and a producer. As a consumer, a particular slave process may receive a produced data set from another slave process in a previous stage. The particular consumer slave process may in turn execute one or more operations on the produced data set and, as a result of the execution, become a producer slave process that produces another data set for consumption by the next stage slave process(es). Thus, the particular slave process was a consumer slave process at one point in time and a producer slave process at a later point in time. For example, continuing with FIG. 2, slave process s4 250, s5 255, s6 260, and s7 265 are consumers in relation to the data set produced by slave process s0 210 as described above. Using the produced data set, the slave processes, s4 250, s5 255, s6 260, and s7 265, produce new data sets. QC 205 coordinates with slave s0 210, s1 215, s2 220 and s3 225 at third stage 277 to receive the new data sets produced by slave process s4 250, s5 255, s6 260, and s7 265 at second stage 247. Accordingly, slave processes s4 250, s5 255, s6 260, and s7 265 are both consumers and producers.

Pivoting Data for Parallel Execution

Figure 3:
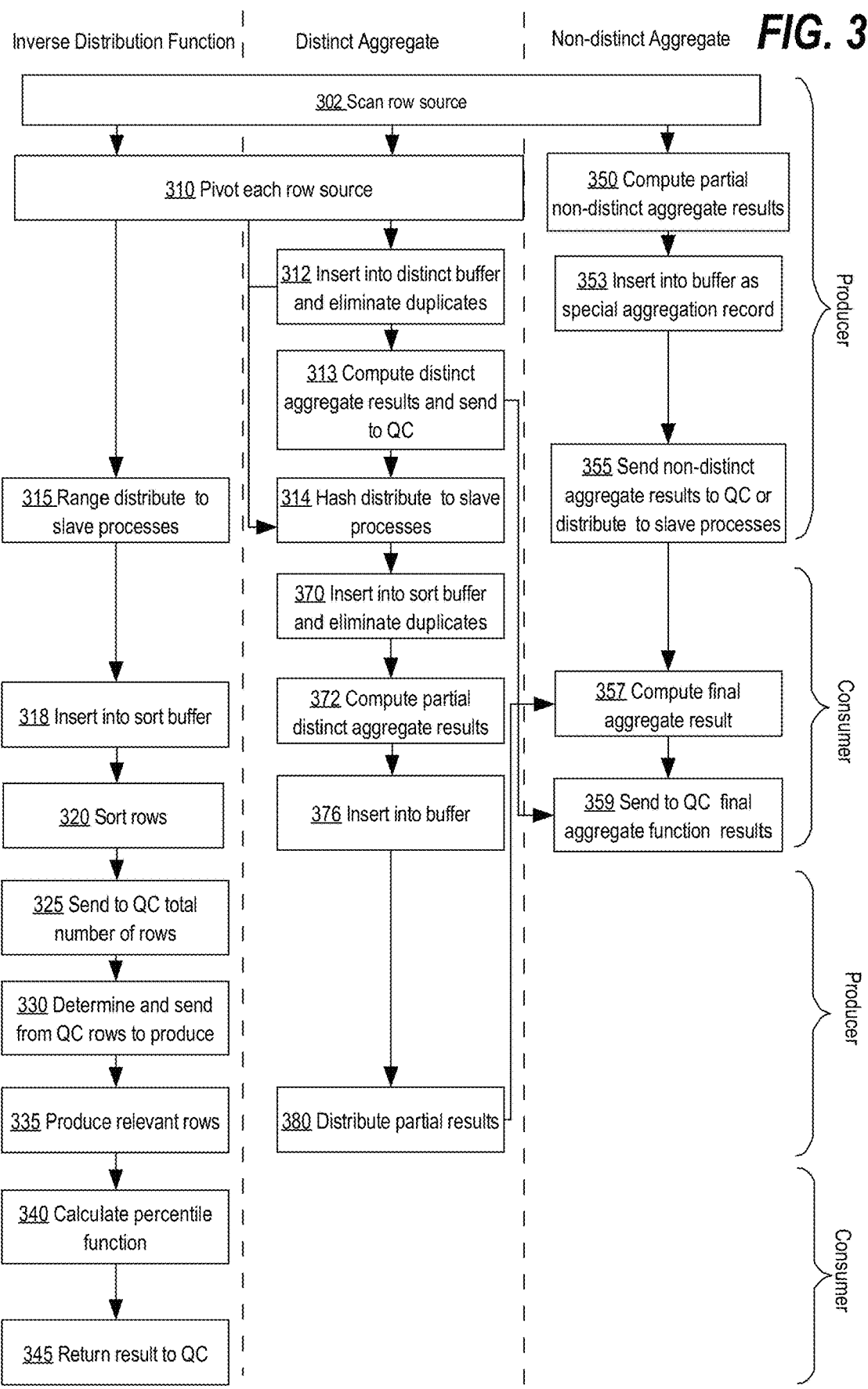
FIG. 3 is a flow diagram that depicts a DBMS parallel processing of a query with inverse distribution, distinct and/or non-distinct aggregate functions, in an embodiment.

Consumer and producer slave processes are used in the parallel processing of inverse distribution, distinct and non-distinct aggregate functions. FIG. 3 is a flow diagram that depicts a DBMS parallel processing of in a single set aggregation query with inverse distribution, distinct and/or non-distinct aggregate functions, in an embodiment. Based on the functions in in a single set aggregation query, the DBMS determines whether sort operations are to be performed on measure columns of target data sets of the functions in the query. A function, such as MIN or MAX, may be evaluated by scanning the values in the measure column of the function in the target data set and aggregating the values without sorting them. For example, for a MAX function, the DBMS scans each row in the measure column and compares the value at the row with the previously determined maximum value. If the row value is greater than the previously determined maximum value, then the row value becomes the maximum value, otherwise the next row is scanned. Accordingly, functions that can aggregate measure column values without the need of performing duplicate value removal first (which may require a sort operation) are referred herein as "non-distinct aggregate functions."

On the other hand, the functions, such as percentile functions, which are evaluated based on a sorted set of the respective measure column values and thus, require sort operations, are referred herein as "inverse distribution" functions. The functions that in addition to a sort operation or an aggregation also perform duplicate value removal in the measure column (to operate on a set of distinct values) are referred herein as "distinct" or "distinct aggregate" functions.

To evaluate multiple functions with different measure columns or a same measure column, the DBMS may pivot a row in a target data set multiple times. During pivoting, the column values may be encoded differently for each function and/or measure column to differentiate measure column values corresponding to the functions. Thus, after the pivoting, the DBMS can identify which measure column values correspond to which measure columns and/or which functions.

To execute a query with one or more functions in parallel, a QC of the DBMS spawns one or more slave processes up to as many as the degree of parallelism selected by the DBMS, in an embodiment. To evaluate inverse distribution, distinct and non-distinct aggregate functions, one or more parallel producer processes of the first stage scan rows of the measure columns specified in the query. FIG. 2 depicts only a single process, s0 210, at first stage 207. However in a different embodiment, multiple producer processes, for example s0 210 through s3 225, scan in parallel the target data set containing the measure columns. Each producer process scans in parallel a segment of the data blocks that contain the measure column values. The DBMS may assign equal size segments to each slave process to scan. However, other techniques for dividing up the rows of the target data set are envisioned herein.

At block 302 of FIG. 3, rows are scanned from a target data set of the query, and depending on the measure column in a scanned row, a different set of blocks in FIG. 3 is used to process the measure column value of the row. At block 310, for row values in the measure column of an inverse distribution function, the one or more of the spawned slave processes pivot the row values and generate aggregation records for the inverse distribution function of the query. In an embodiment in which the query contains multiple inverse distribution functions with different measure columns, aggregation records generated for the different measure columns have respectively different aggregation codes. Similarly, at block 310, for row values in the measure column of a distinct aggregate function, the row values are pivoted to produce another set of aggregation records, however, with a different aggregation code.

For row values in the measure column of a non-distinct aggregate function, a producer process at block 350 computes the partial result of the function based on the scanned row. For each row scanned, the slave producer process uses the previously computed partial result value stored in the entry of the partial results buffer allocated for the non-distinct aggregate function and the new value received in the scanned row data to re-compute the partial result for the function. The re-computed partial result is stored back into the same entry of the partial results buffer at block 353.

The partial result may be encoded with a special aggregation code corresponding to the non-distinct aggregate function, in an embodiment. The special aggregation code is appended to the partial result to produce a special aggregation record, which at block 353, the slave producer process stores into the partial results buffer.

In an embodiment in which only a single producer process is scanning the target data set, at the end of the scan, all the values of the measure column for non-distinct aggregate functions in the query are processed. Thus, the special aggregation record for the non-distinct aggregate contains the final results of the non-distinct aggregate functions. At block 355, the slave process may send the final results to QC.

In an embodiment in which multiple producer processes are scanning a portion of the target data set, each process's special aggregation record for the non-distinct aggregate function contains a partial result for the non-distinct aggregate function. The partial results are to be further aggregated by the QC or the next stage of consumer slave processes. At block 355, the slave processes become producer processes and distribute the partial result for the non-distinct aggregate function to the consumer slave processes using range, hash or random distribution. Alternatively or additionally, the producer processes may send to the QC additional information about partial results for computation of the final result for the non-distinct aggregate function such as the number of measure column values each process has processed.

To illustrate the parallel processing of a single set aggregation query with inverse distribution functions, by the DBMS, the following query, Q1, is used:

Q1: select /*+ parallel */
    percentile_cont(0.6) within group (order by price desc),
    percentile_disc(0.6) within group (order by property_tax desc),
    sum(price), max(property_tax), count(distinct price)
    from homes;

Q1 contains two percentile functions on different columns: "percentile_cont(0.6) within group (order by price desc)" and "percentile_disc(0.6) within group (order by property_tax desc)"; non-distinct aggregate functions: "sum (price)" and "max(property_tax)" and a distinct aggregate on one of the columns: "count(distinct price)." For the execution of Q1, the DBMS determines that the two PERCENTILE inverse distribution functions are to be evaluated with two separate sort operations on the two respective measure columns, "price" and "property_tax." Since Q1 further contains a distinct aggregate function on the "price" column as well, in an embodiment, the DBMS determines that the sort evaluation on the "price" column is to be performed separately from the sort evaluation on the same column for the percentile function because the sort operation for the distinct aggregate function is performed with duplicate elimination. Thus, to perform these sorts with a single sort operation, the DBMS determines to pivot rows twice for the "price" measure column using different aggregation codes: once for the percentile function and once for the distinct aggregate function. The encoding enables tracking row values for each measure column based on assigned code even after pivoting the different measure column values into a same column/buffer. Thus, a single sort operation performed on all the measure columns in the buffer, sorts all row values in groups encoded by the code. Therefore, this approach avoids multiple sort operations, saves compute resources and accelerates the search in comparison with individually performing a sort operation for each function in a query that requires the sort operation.

According to one approach to generate aggregation records, aggregation records are concatenating with an aggregation code for the particular function to the string or binary representations of values of the measure column. The measure column values may be appended with predetermined number of bytes that contains an aggregation code. According to another approach, the measure column values are first re-casted into a datatype that has a greater size. The additional most significant bits of the re-casted values are then utilized for an aggregation code.

Since aggregation records contain the aggregation code followed by values from a corresponding measure column, when sorted, the aggregation records would have the same order as the sorted values of the measure column. Other approaches are envisioned for generating aggregation records sortable in the same order as values of the measure column of the function for which the aggregation records are generated.

FIG. 1 is a block diagram that depicts using aggregation codes for pivoting rows for an evaluation of inverse distribution and distinct aggregate functions, in an embodiment. In this example, "homes" table 110 in query Q1 described above is pivoted for evaluation of the functions in Q1. Each function in Q1, for which rows are pivoted, is assigned an aggregation code: "percentile_cont(0.6) within group (order by price desc)" is assigned the aggregation code of 0, "percentile_disc(0.6) within group (order by property_tax desc)" is assigned the aggregation code of 1 and "count (distinct price)" is assigned the aggregation code of 2. As slave processes fetch rows from "homes" table 110, the slave processes construct corresponding aggregation records for each row for each aggregation code. The slave processes append the corresponding aggregation codes to the values of the respective measure columns. Transformed rows 120 illustrate the pivoted rows according to the aggregation records depicted in the "aggregation_record" column. In some embodiments, the slave process may duplicate the row data for each pivoted row or have a pointer in the pivoted row to the row data in the original table (e.g. the "home_id" column may serve as such a pointer to the respective row data).

In other embodiments, the DBMS skips pivoting at block 310 of FIG. 3 because the received query has only a single sort operation to be evaluated. The following query, Q2, is one such example.

Q2: select /*+ parallel */
    percentile_cont(0.6) within group (order by price desc),
    percentile_disc(0.6) within group (order by price desc)
    from homes;

Although, Q2 contains two inverse distribution PERCENTILE functions, since these functions are on the same column, the DBMS determines that only a single sort operation is to be evaluated in the execution of Q2. Accordingly, the rows of the "homes" table are not pivoted, and the row values in the measure column, "price," may then be used by the DBMS as aggregation records.

In an embodiment, measure columns of non-distinct aggregate functions in a query may not be pivoted as well. Continuing with the example query of Q1 on "homes" table 110 depicted in FIG. 1, the non-distinct aggregate functions of Q1 may be evaluated without sort operations. For example, the "sum(price)" function that sums up all values (including duplicates) in the "price" measure column, may be evaluated by a traversal of the "price" column in any sequence during the initial or subsequent scans of the measure column/aggregation records.

Figure 4A:
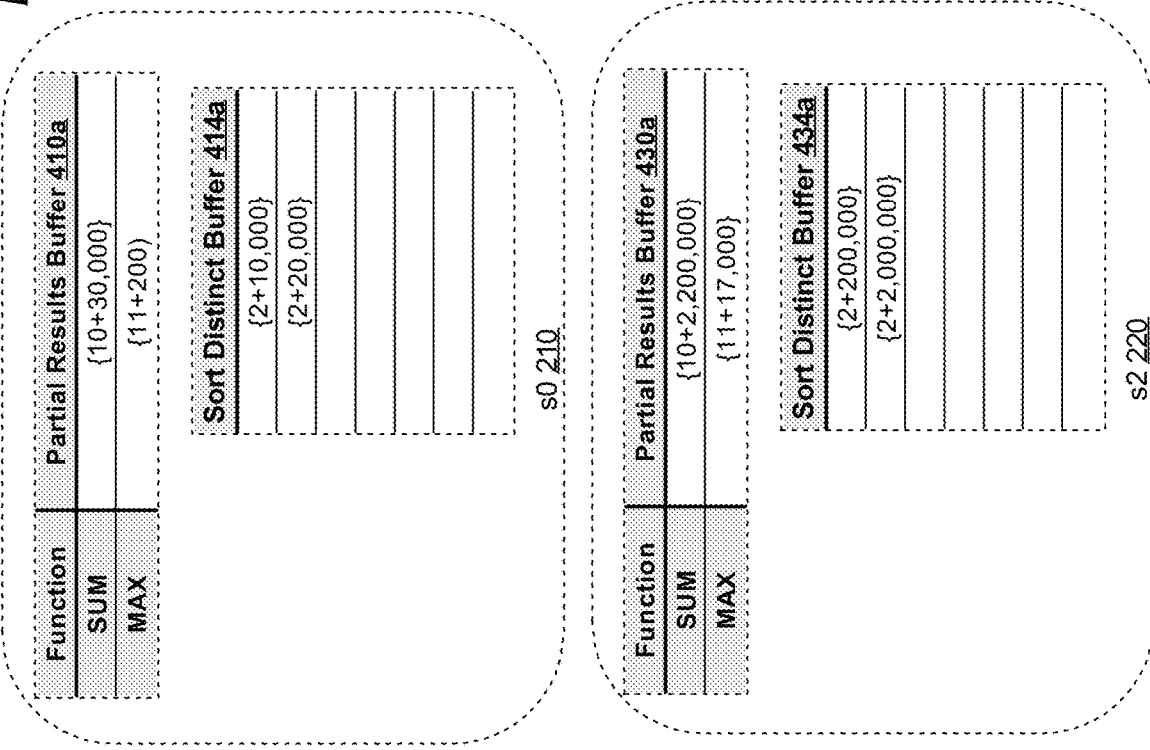

FIG. 4A depicts buffers maintained by producer processes scanning "homes" table 110. Each of producer processes s0 210, s1 215, s2 220 and s3 225 scans a portion of the table. For example, producer process s0 210 scans first two rows, while producer process s1 215 scans the next two rows and so force. Each process maintains a partial results buffer for non-distinct aggregate functions of Q1: "sum(price)" and "max(property_tax)," which are initially set to zero, to be updated when a new value is scanned from the respective measure columns of "price" and "property_tax".

For example, when s0 210 scans the row corresponding to "home_id" 1, the value of 10,000 is stored into partial results buffer 410a encoded as an aggregation record for the "sum (price)" non-distinct aggregate function. When the next row is scanned, corresponding to "home_id" 2, the value at partial results buffer 410a corresponding to the "sum (price)" function is added to the newly scanned value of 20,000, and the result is stored back into partial results buffer 410a. Similarly, the producer processes compute "max (property_tax)" function for the respective rows scanned. After completing the scan of the allocated rows, FIG. 4A depicts the aggregation records for the computed partial results for the non-distinct aggregate functions of Q1 in partial results buffers 410a, 420a, 430a and 440a. The special aggregation codes of 10 and 11 are used to differentiate the partial results for "sum(price)" and for "max (property)" stored as aggregation records. In an embodiment, special aggregation codes are used to differentiate partial results of non-distinct aggregate functions from other aggregation records stored in a same buffer. The aggregation records coded with a special aggregation code, special aggregation records, may be used by a producer to distribute partial results for a non-distinct aggregate function to the same consumer slave process. In another embodiment, a separate buffer may be allocated by each producer process for each non-distinct aggregate function (not shown in FIG. 4A). In the next stage, the special aggregation code, corresponding to the particular non-distinct aggregate function for which the partial result is computed, is appended to the partial result. Accordingly, in the next stage, memory buffer may store an aggregation records coded with the special aggregation code for the non-distinct aggregate function. Additionally, the special aggregation records may also be used by the QC or the next stage of consumer processes to select all the partial result aggregation records for a particular non-distinct aggregate function to compute a final result. Further, the evaluation of non-distinct aggregate functions is described in detail in the "Computing Non-Distinct Aggregate Function Results" section.

Similar to special aggregation records for non-distinct aggregate functions, pivoted rows for distinct aggregate functions are also distributed to next level of consumer process. Continuing with FIG. 3 flow diagram, at block 315, the aggregation records for inverse distribution functions are distributed based on ranges to the next stage slave processes, in an embodiment. The ranges of the aggregation records are determined by the QC and then passed on to the producer slave processes or are determined by the producer slave processes by scanning the data set to be produced. Once the producer slave process either receives from the QC (or determines itself) the ranges of aggregation records, the producer slave process distributes the rows of the data set according to the aggregation record ranges to the next stage consumer slave processes.

Since the distribution may be performed by ranges, the ranges of aggregation records determine the number of rows that a slave process in the next stage will process. When the ranges are selected to have an equal number of rows for each slave process, the parallel processing of the rows in the next stage is more efficient. Each slave processes would consume equal processing time for execution of operations on an equal number of distributed rows. Accordingly, the data would be produced substantially at the same time for the next stage slave processes, and the slave processes wait time for each other to finish would be minimized.

The ranges of aggregation records that yield approximately equal number of rows are determined based on heuristics derived from data statistics, in an embodiment. Since measure column values that are part of the aggregation records, have been most likely processed by the DBMS before, the DBMS may have collected data statistics on those column values. Using the data statistics on the measure column values, the DBMS determines the ranges for each measure column. Based on the determined ranges, the DBMS determines the appropriate ranges of the aggregation records to distribute the pivoted rows accordingly.

In another embodiment, the measure column values are sampled by the slave processes that are scanning the target data set containing the measure column and/or the QC. A percentage or a pre-determined number of rows are scanned by the slave processes and then sent to the QC for range determination. Alternatively, the slave processes may first sort the portion of rows of the target data set and then send the rows to the QC to determine the ranges. The QC sorts the received rows based on the measure column and determines the ranges for the measure column based on the sorted values and the degree of parallelism (number of slave processes).

In yet another embodiment, the ranges for the aggregation records of the data set may be determined based on the maximum values in the measure columns. The maximum values are then divided by the number of processes to consume data to yield the range endpoints of the measure column values for each of the consumer processes. Once the ranges for the measure columns are determined, the range endpoints are appended with the respective aggregation codes to produce the aggregation record ranges.

The QC communicates the determined ranges of the aggregation records to producers to distribute pivoted rows according to ranges to consumer slave processes, in an embodiment. For example, "homes" table 110 in FIG. 1 contains two measured columns for Q1: "price" and "property_tax." For range distributing pivoted rows into four slave processes to continue executing Q1, the DBMS determines the ranges for the two measured columns. For the "price" column, the ranges are determined to be [0, 15000), [15000, 150000), [150000, 750000) and [750000, ∞), and for the "property_tax" column: [0, 150), [150, 1500), [1500, 7500) and [7500, ∞). Accordingly, the ranges for the "aggregation_record" column would be the same ranges with the respective aggregation code for the function appended to the corresponding range.

For example, process s0 210 of FIG. 2 may scan and pivot the rows of "homes" table 110. The QC may calculate the ranges as described above and communicate the calculated ranges to s0 210. Based on the received ranges, producer s0 210 range distributes the pivoted rows to stage 247 and respectively slave consumer processes: s4 250, s5 255, s6 260 and s7 265. For example, s0 210 may distribute to consumer s4 250 the pivoted rows corresponding to: range of the aggregation record values from {0+0} up to but not including {0+15000}; range of the aggregation record values from {1+0} up to but not including {1+150}; and range of aggregation record values from {2+0} up to but not including {2+15000}, where the "+" sign indicates that an aggregation code that precedes the sign is appended with the measure column value following the sign. Similarly, consumers s5 255, s6 260 and s7 265 receive the pivoted rows corresponding to the measure column value ranges appended with the appropriate aggregation codes.

Computing Inverse Distribution Function Results

The slave processes that receive range-distributed data sets of pivoted rows may compute functions in parallel. In an embodiment, each slave process maintains multiple buffers: one memory buffer is used for storing and sorting by the aggregation record values (referred to as "sort buffer") and another buffer is used for the slave process to compute and store partial non-distinct aggregate function results (referred to as "partial results buffer"). In another embodiment, the sort buffer and the partial results buffer of a slave process are a single buffer. The slave process uses a special aggregation code to generate an aggregation record for the partial result of a non-distinct aggregation function. Thus, the slave process may retrieve and store the partial result of the non-distinct aggregation function from the single buffer that also contains other aggregation records.

Figure 4C:
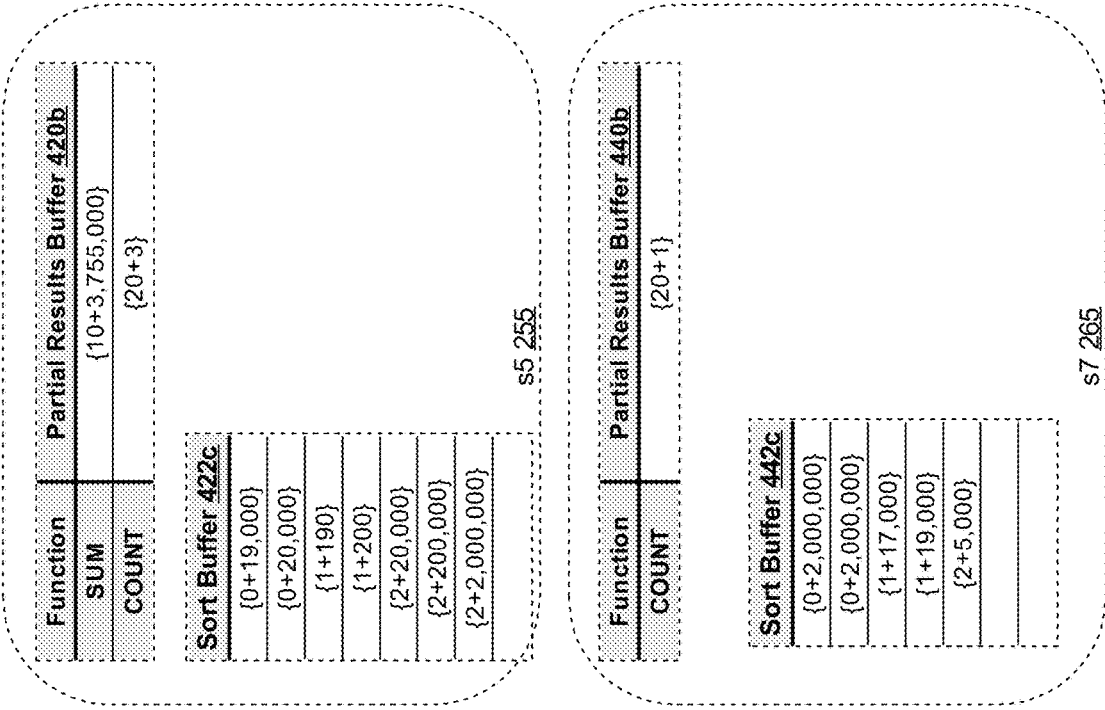
Figure 4C:
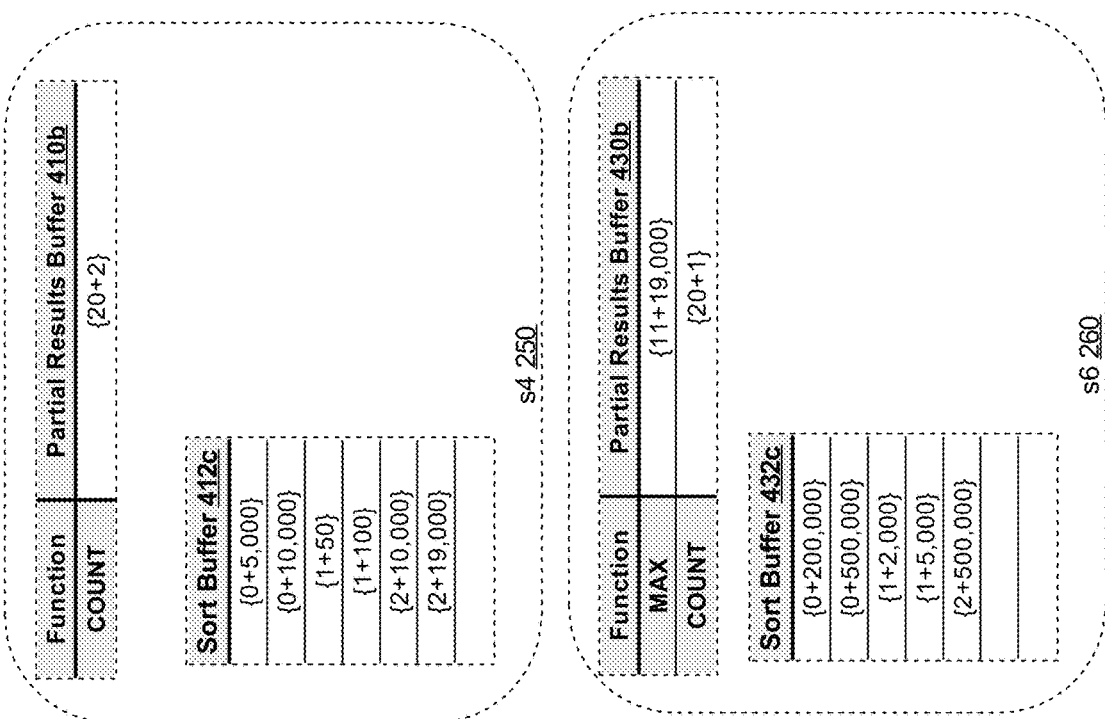

Continuing with FIG. 3 flow diagram, at block 318, if the aggregation code of a received pivoted row corresponds to an inverse distribution function, the receiving consumer slave process inserts at least the aggregation record of the pivoted row into a sort buffer. At block 320, each consumer slave process that has received and stored data from pivoted rows, sorts the respective sort buffer. The sorting of the sort buffer arranges the aggregation records in an order and, thus, also groups the aggregation records based on the aggregation codes. Accordingly, by tracking how many aggregation records for each aggregation code have been received, a slave process may access one or the other group of aggregation records based on their position in the sorted buffer. For example, FIG. 4C depicts the buffers of FIG. 4B after sorting. The values in the sort buffers are in increasing order and are grouped by the aggregation codes as the result of the sorting operation.

In an embodiment, at block 325, slave processes that sorted aggregation records in their respective sort buffer send to the QC the counts of aggregation records in the buffer for each aggregation code. The QC uses the counts for locating any value in the distribution of aggregation records for a particular aggregation code. Since the aggregation records for the particular aggregation code correspond to values of the measure column for which the aggregation records were generated, the value distribution of the ordered aggregation records matches the value distribution of sorted measure column values. Accordingly, an inverse distribution function on a measure column may be computed by applying the inverse distribution function to the distribution of the aggregation records for the aggregation code corresponding to the measure column.

In an embodiment, at block 330, the QC of slave processes determines the location(s) of aggregation records for computing the result of an inverse distribution function and sends the location(s) to appropriate slave process(es) to produce the corresponding row data. For example, to determine the location(s) for a percentile function, the percentile function's parameter, a real number between zero and one, is multiplied by the sum of all counts of aggregation records for the corresponding aggregation code. However, if the percentile function specifies a different order than the current sort order of aggregation records in sort buffers (ascending or descending), then the parameter is subtracted from one and then only multiplied by the sum of the received counts. Based on the product of the multiplication, which represents the ideal location of the percentile function result, the QC determines the location(s) of the aggregation record(s) that would yield the final result of the function.

In an embodiment, the location of aggregation record(s) for computing a percentile function may be approximately calculated using the following equation:

$$RN=(1+(P*(N-1))),$$

where N is the sum of the received counts, P is the percentile and RN is the ideal location offset.

The "ideal location offset" term refers to the ideal position in a list of sorted values of a measure column that corresponds to the percentile specified in the function. If the ideal location offset is non-integer real number, then the ideal position does not exist in the sorted values of the measure column, and thus, the measure column value corresponding to this position is approximated using the adjacent value(s) in the sorted list of the measure column values.

In an embodiment, in which the percentile function is discrete, the ideal location offset, such as RN, is rounded to the nearest integer to yield a location offset. As aggregation records of a particular aggregation code have one to one correspondence with the measure column values, the location offset also represents the location in the sorted sequence of aggregation records that is substantially equivalent to the requested percentile in the percentile function for the measure column values. With the information on aggregation record counts in each sort buffer of each slave process, as well as, the information on which range of aggregation records is stored in which of the sort buffers, the QC determines the sort buffer entry that corresponds to the location offset. The final result of the percentile of the discrete inverse distribution function is based on the aggregation record value of the sort buffer entry.

At block 345, the QC requests the slave process to return the aggregation record at the identified sort buffer entry. Using the retrieved aggregation record, the QC determines the result of the percentile function by either retrieving the measure column value corresponding to the aggregation record or converting the aggregation record back into a measure column value. Additionally or alternatively, at block 335, the QC may request the identified slave process to produce the identified aggregation record to a next stage consumer process, which in turn, at block 340, retrieves the measure column value from the received row data or decodes the measure column value from the aggregation record. At block 345, the next stage slave process returns to the QC the measure column value for the result of the percentile function.

For example, to continue the evaluation of query Q1 and particularly for the "percentile_disc(0.6) within group (order by property_tax desc)" function, slave process s4 250 communicates with QC 205 notifying QC 205 that its sort buffer 412c has 2 entries for the aggregation code of 1 that corresponds to the "property_tax" measure column. Similarly, s5 255 notifies QC 205 that its sort buffer 422c has also 2 entries for the aggregation code, s6 260 also notifies QC 205 that its sort buffer 432c has also 2 entries for the aggregation code, and s7 265 also notifies QC 205 that its sort buffer 442c has also 2 entries for the aggregation code. QC 205 sums up the counts received from each of the slave process to yield the total count of 8 entries for the aggregation code of 1. The percentile function parameter in Q1 is 0.6 while the order for the inverse distribution specified is descending ("desc"). Since the sort buffers are sorted in the ascending order, the percentile parameter is modified by being subtracted from 1, yielding 0.4 as the new percentile parameter. Using the RN equation above, RN for this percentile function is computed to be (1+(0.4*(8−1))=3.8. The rounding of the RN value yields the location offset of 4. Based on the distribution information, QC 205 has the information that s4 250 has the first range of aggregation records in its sort buffer 412c, and s7 265 has the last range of the aggregation records in its sort buffer 442c. Furthermore, the distribution information indicates that each of the slave processes has two entries for the aggregation code of 1. Based on this distribution information, QC 205 determines that the second slave process s5 255, in sort buffer 422c, has the fourth lowest value, corresponding to the location offset of 4, as the second entry for aggregation code 1. QC 205 requests the s5 255 to produce the aggregation record (and in some embodiment, the row data) corresponding to the second entry in sort buffer 422c to next stage consumer process s1 215 (or any other consumer process in the next stage). The measure column values may be derived from the produced aggregation record or retrieved from the row data corresponding to the aggregation record. Slave process s1 215 sends to QC 205 the corresponding value of the measure column, 200, as the final result for the "percentile_disc(0.6) within group (order by property_tax desc)" function.

In an embodiment, QC 205 processes a continuous percentile function differently from discrete percentile function. Since the continuous percentile may not be evaluated to an actual value in a measure column, the calculated ideal location offset is further evaluated. In one embodiment, at block 330, the two closest integers to RN are computed: the ceiling value of RN and the floor value of RN. Ceiling RN and floor RN are the location offsets for the aggregation record values that are needed to calculate the continuous percentile function. Based on the location offsets, the QC determines the slave process(es) and entries of buffers that correspond to these location offsets. The QC communicates to the slave processes to produce the aggregation records (and in some embodiments, the row data corresponding to those location offsets) to the next stage slave processes or return the aggregation records to the QC. At block 335, the slave processes produce the QC requested aggregation records (and/or row data) to a next stage process or returns it to the QC. At block 340, the QC or the next stage process computes the continuous percentile based on an interpolation of values of the measure columns corresponding to the requested aggregation records. The measure column values may be derived from the requested aggregation records or retrieved from the row data corresponding to the aggregation records. The continuous percentile value is then calculated according to the following equation:

$$(\text{Ceiling}(RN) - RN) * (\text{value at Floor}(RN)) + (RN - \text{Floor}(RN)) * (\text{value of at Ceiling}(RN))$$

For example, continuing with the parallel execution of query Q1, the "percentile_cont(0.6) within group (order by price desc)" function is computed using pivoted rows of FIG. 1 with the assigned aggregation code of 0 assigned to the function. Slave processes s4 250, s5 255, s6 260 and s7 265 send to QC 205 the counts of aggregation records with the aggregation code of 0 in their respective sort buffers 412c, 422c, 432c and 442c. QC 205 sums the counts to yield the total number of aggregation records for the continuous percentile function determined to be 8. Using the total count and the parameter of the percentile function, 0.6, QC 205 determines that the ideal location offset for the percentile, RN, to be 3.8. Accordingly, to determine the continuous percentile, QC 205 requests the slave processes to produce the aggregation records and/or corresponding row data for the floor ideal location offset of 3 and the ceiling ideal location offset of 4. Based on the known range distribution and counts of aggregation records per the slave processes, QC 205 determines that the floor ideal location offset of 3 and the ceiling ideal location offset of 4 correspond to entries 1 and 2 of sort buffer 422c. QC 205 requests s5 205 to produce the aggregation records and/or the corresponding row data for those entries to next stage slave consumer process s1 215. Slave process s1 215 uses the above equation to compute the continuous percentile function, (4−3.8)*19,000+(3.8−3)*20,000=19,800. Slave process s1 215 produces the computed value to QC 205 as the final result for the "percentile_cont(0.6) within group (order by price desc)" function.

Computing Distinct Aggregate Function Results

In an embodiment, pivoted aggregation records corresponding to a distinct aggregate function are not directly distributed to the next stage of parallel processes. Rather, the distinct aggregate aggregation records are fully or partially eliminated from duplicate values by each of the producer slave processes scanning the target data set of a query. A memory buffer is used by a producer slave process for removing duplicates (referred to as "sort distinct buffer"). In an alternative embodiment, sort distinct buffer and partial results buffer are one and the same. A producer process distinguishes between aggregation records for distinct aggregate functions and non-distinct aggregate functions in the buffer based on aggregation codes assigned. At block 312 of FIG. 3, the value of a newly constructed aggregation record for the distinct function measure column is checked against the function aggregation records already stored in the sort distinct buffer. If no duplicate exists, then the aggregation record is stored into the sort distinct buffer, otherwise the aggregation record is discarded as a duplicate. At the end of the scan by the producer process, the sort distinct buffer contains distinct/non-duplicative aggregation records for the scanned rows of the measure column.

For a single producer slave process scanning the target data set, the sort distinct buffer contains a complete set of distinct/non-duplicative aggregation records for the measure column. In such an embodiment, the producer slave process may allocate additional buffer space for the final aggregation results of the distinct aggregate function. As each non-duplicative aggregation record is inserted into the sort distinct buffer, the producer process computes a partial aggregate result based on the value of the aggregation record and the value at the final aggregation result buffer, at block 313 of FIG. 3. If all rows of the target data set are scanned by the producer process, then the value at the aggregation result buffer is the final distinct aggregate function result for the query and can be directly sent to the QC.

In another embodiment, the partial aggregate result of a distinct aggregate function is evaluated after duplicates have been eliminated in the sort distinct buffer of the distinct aggregate function, at block 312. At block 313, a separate buffer may be allocated for the partial result, and as the sort distinct buffer is scanned, the allocated buffer may be updated with the evaluated partial result of the aggregate function. In the next stage, the special aggregation code, corresponding to the particular distinct aggregate function for which the partial result is computed, is appended to the partial result.

In an embodiment, a producer slave process scanning the target data set may have limited space in distinct buffer. For example, the sort distinct buffer may be limited by the size of volatile memory allocated to a producer slave process, and the process may need to ensure that allocated memory is not exceeded. Accordingly, if at block 312, if inserting a new globally unique aggregation record into the buffer exceeds the allocated memory, the sort distinct buffer, along with the new globally unique aggregation record, and subsequent pivoted aggregation records are distributed to the next stage of parallel processes, in an embodiment.

For example, FIG. 4A depicts sort distinct buffers 414a, 424a, 434a and 444a of respective producer processes s0 210, s1 215, s2 220 and s3 225. As the producer processes scan and pivot the target data set of Q1, "homes" table 110 of FIG. 1, a process stores in its respective sort distinct buffer the distinct aggregate aggregation records that are unique to the sort distinct buffer. For example, if another "price" column value of 10,000 is scanned by s0 210 and another aggregation record of "{2+10,000}" is generated by s0 210, s0 210 would discard the aggregation record rather than storing a duplicate into sort distinct buffer 414a. Accordingly, after completing the pivoting, sort distinct buffer 414a contains all distinct aggregation records for rows of the measure column "price" which were scanned and pivoted by s0 210. Since, a producer process may analyze only a portion of a measure column, the aggregation records across sort distinct buffers may still contain duplicates: such as "{2+2,000,000}" value that is stored in both sort distinct buffer 434a of process s2 220 and sort distinct buffer 444a of process s3 225.

To accurately evaluate a distinct aggregate function, slave processes need to discard such global duplicate values of the measure column across all producer slave processes. In an embodiment, at block 314, a producer slave process hash distributes aggregation records for a distinct aggregate function to the next stage of slave processes to globally eliminate duplicates in the measure column of the distinct aggregate function.

In an alternative embodiment, a producer slave process does not maintain a sort distinct buffer and rather, directly hash distributes the pivoted aggregation records for a distinct aggregate function to the next stage of slave processes for the next stage slave processes to globally eliminate the duplicates. Such approach may increase the number of aggregation records to be transferred from producer stage processes to consumer stage processes as part of the hash distribution.

The term "hash distribute" refers to hashing distinct aggregate aggregation records and distributing them evenly to the next stage processes such that duplicate hash values end up with the same slave consumer process. The term "hashing" (or applying hash algorithm) refers herein to a technique that maps any length input data, such as an aggregation record, to a fixed length data, referred to as a "hash value." The longer the length of the hash value, the more accurately the hash algorithm ensures that different input data produces different hash values. Therefore, each unique aggregation record corresponds to a unique hash value. Additionally, the generated hash values are evenly distributed between the minimum hash value and the maximum hash value and, thus, can be divided into substantially equal sets by performing a remainder operation on the hash values.

In one embodiment, each slave process hashes an aggregation record and performs a remainder operation on the generated hash values with the number of slave processes. Based on each unique remainder result, the slave process sends the hash value (and in some embodiments, the input aggregation record and/or corresponding row data) to the next stage slave process. In another embodiment, the producer slave processes that generated hash values may range distribute aggregation records based on the corresponding hash values to next stage slave processes.

Continuing with sort distinct buffers described in FIG. 4A, slave producer process s0 210 hashes the aggregation records in sort buffer 414a. Since the degree of parallelism of the parallel processing is 4 (as depicted in FIG. 2), slave process s4 250 performs a remainder operation on the generated hash values with the value of 4. If the remainder result is 0, then s0 210 sends the aggregation record, for which the hash value was generated, to s4 250; if the result is 1, then s0 210 sends the aggregation record to s5 255; if the result is 2, then s0 210 sends the aggregation record to s6 260; if the result is 3, then s0 210 sends the aggregation record to s7 265. For example, the aggregation records for "count (distinct price)" with values "{2+19,000}" and "{2+10,000}" yielded hash values with remainder of 0 and thus, s0 210 distributed the aggregation records to slave process s4 250, as depicted in sort buffer 412b in FIG. 4B.

At block 370, the next stage slave consumer processes receive distributed hash values and remove duplicates. The approach ensures that the aggregation codes corresponding to duplicate hash values are received by the same slave process because the remainder operation on the same hash values yields the same result. The receiving consumer slave process may discard the duplicates by checking for duplicate aggregation records already stored in a buffer of the process; or storing the duplicates and sorting the aggregation records in the process's sort buffer to eliminate duplicates; or by utilizing any other data structure such as a hash table.

At block 372, as received aggregation records for a distinct aggregate function are inserted into a buffer of a slave process, the slave process computes a partial result for the aggregate function based on the unique/non-duplicative aggregation records. In another embodiment, the partial aggregate result of a distinct aggregate function is evaluated after duplicates have been eliminated using a separate memory buffer, at block 372. For each unique distinct aggregate aggregation record received, the slave process uses the previously computed partial result value stored in the entry of a partial results buffer corresponding to the distinct aggregate function. The aggregate function is applied to the previously computed entry and the measure column value of the received distinct aggregation record to re-compute the partial result for the function.

At block 376, the slave process stores the re-computed partial result back into the partial results buffer. The partial result may be stored in the buffer as a special aggregation record with an aggregation code corresponding to the distinct aggregate function. Once the aggregation records are processed by the slave consumer processes, at block 380, each slave process becomes a producer process and distributes the partial results in the partial results buffer to the next stage of slave processes. The distribution is performed in a manner to ensure that all the partial results for a particular distinct aggregate function are sent to a single slave process for final result computation at block 357. In an embodiment, each slave process may communicate with the QC to relate additional information about the partial results, such as the number of distinct aggregation records processed by each slave process. In an alternative embodiment, the partial results are sent to QC, along with the additional information, to directly perform the final computation of the distinct function and produce the result for the query.

In an embodiment, at block 357, a process in the next level of consumer processes receives the partial results of a distinct aggregation function in form of special aggregation records. The consumer slave process computes the final result of the distinct aggregate function based on the partial result received. In an embodiment, the slave process may communicate with the QC to receive additional information, such as total number of distinct aggregation records for the distinct aggregate function in the previous stage, to produce the final result of the distinct aggregation.

Continuing with the example of Q1 execution for "count (distinct price)" distinct aggregate function, FIG. 4B depicts sort buffers 412b, 422b, 432b and 442b that contain aggregation records stored in response to receiving them in the hash distribution. For example, s5 255 slave process has received aggregation records with {2+200,000}, {2+20,000}, {2+2,000,000} and {2+2,000,000}. Each time a unique aggregation record is received, s5 255 retrieves the count aggregation code from partial results buffer 420b and increments the count value. When the second {2+2,000,000} aggregation record is received, s5 255 determines that such aggregation record already exists in sort buffer 422b and thus, discards the received aggregation record without incrementing the count special aggregation record in partial results buffer 420b. After processing the received aggregation records, slave processes s4 250, s5 255, s6 260 and s7 265 produce the partial results for the count distinct aggregate function to a process in the next level processes for the computation of the final result for the function. Such process, may be any of the original processes: s0 210, s1 215, s2 220 and s3 225, or a new process. The selected consumer slave process adds the partial results received to yield the final result, and communicates the final result of "count (distinct price)" in Q1 to QC 205.

Computing Non-Distinct Aggregate Function Results

The partial results for non-distinct aggregate function(s) computed at blocks 350-355, are received for final aggregation at block 357, in an embodiment. As previously described, the partial results for the non-distinct aggregate functions may be encoded as special aggregation records. In an embodiment, producer slave process may distribute the special aggregation records for a same non-distinct aggregate function to a particular slave process of the next stage consumers. Range, hash or any other distribution may be used as long as the special aggregation records with the same special aggregation code are provided to a single consumer process. In another embodiment, the QC receives the aggregation records for computing the final result(s) for the non-distinct aggregate function(s).

At block 357, to compute the final result for a non-distinct aggregate function in the query, the receiving process may determine the non-distinct aggregate function to apply based on special aggregation codes of the special aggregation records received. The process applies the determined non-distinct aggregate function to the corresponding special aggregation records. For example, different non-distinct aggregate functions (such as SUM, MIN, MAX) may each correspond to a particular range of aggregation codes. If the received aggregation records have an aggregation code in a particular range, then the partial results contained in the aggregation records is computed using the non-distinct aggregate function corresponding to the particular range. In another embodiment, the aggregation code to non-distinct aggregate function mapping information is received by the process to identify which non-distinct aggregate functions to apply on which aggregation records.

The result of the application of a non-distinct aggregation function is the final result for the non-distinct aggregate functions in the query. At block 359, if the process performing the computations is not the QC, the process sends the QC the final result(s) of the non-distinct aggregate functions, in an embodiment.

Continuing with the example of Q1 execution for the "max (property_tax)" and "sum(price)" non-distinct aggregate functions, s6 260 receives the aggregation results containing the partial results of "max (property_tax)" non-distinct aggregate function as depicted in FIG. 4A. Based on special aggregation code 11 in a received special aggregation record, s6 260 determines that the MAX non-distinct function is to be applied to the value in the record. As other aggregation records with special aggregation code 11 are received from s0 210, s1 215, s2 220 and s3 225, s6 260 similarly applies the MAX non-distinct function and writes the result to partial results buffer 430b as depicted in FIG. 4B. Once all the aggregation records with aggregation code 11 have been received, partial results buffer 430b contains the final result for "max (property_tax)," {11+19,000} as depicted in FIG. 4B. S6 260 may send the final result to QC 205 to consolidate the results for the Q1 query.

On the other hand, in this example, s5 255, rather than s6 260, receives the special aggregation records of the partial results for "sum (price)" as depicted in FIG. 4A. Based on the aggregation code of the received aggregation records having the value of 10, s5 255 identifies the SUM function is to be applied on the partial results. Partial results buffer 420b depicts the final result of the computation by s5 255. The final result may be sent to QC 205 for consolidation with the other results of the Q1 query.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A query optimizer of a database management system generates one or more execution plans to execute a query. An "execution plan" or "query execution plan" refers to a set of steps that are generated by a database management system to execute a query. Each step is referred to as an operator and may include a database operation on a database object identified in the query. Non limiting examples of a database operation are scan, join, sort and group by. The query optimizer may generate several candidate execution for a particular query. A candidate execution plan estimated to be most efficient may be selected as the actual execution plan to be executed by the database management system to service the particular query execution request.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
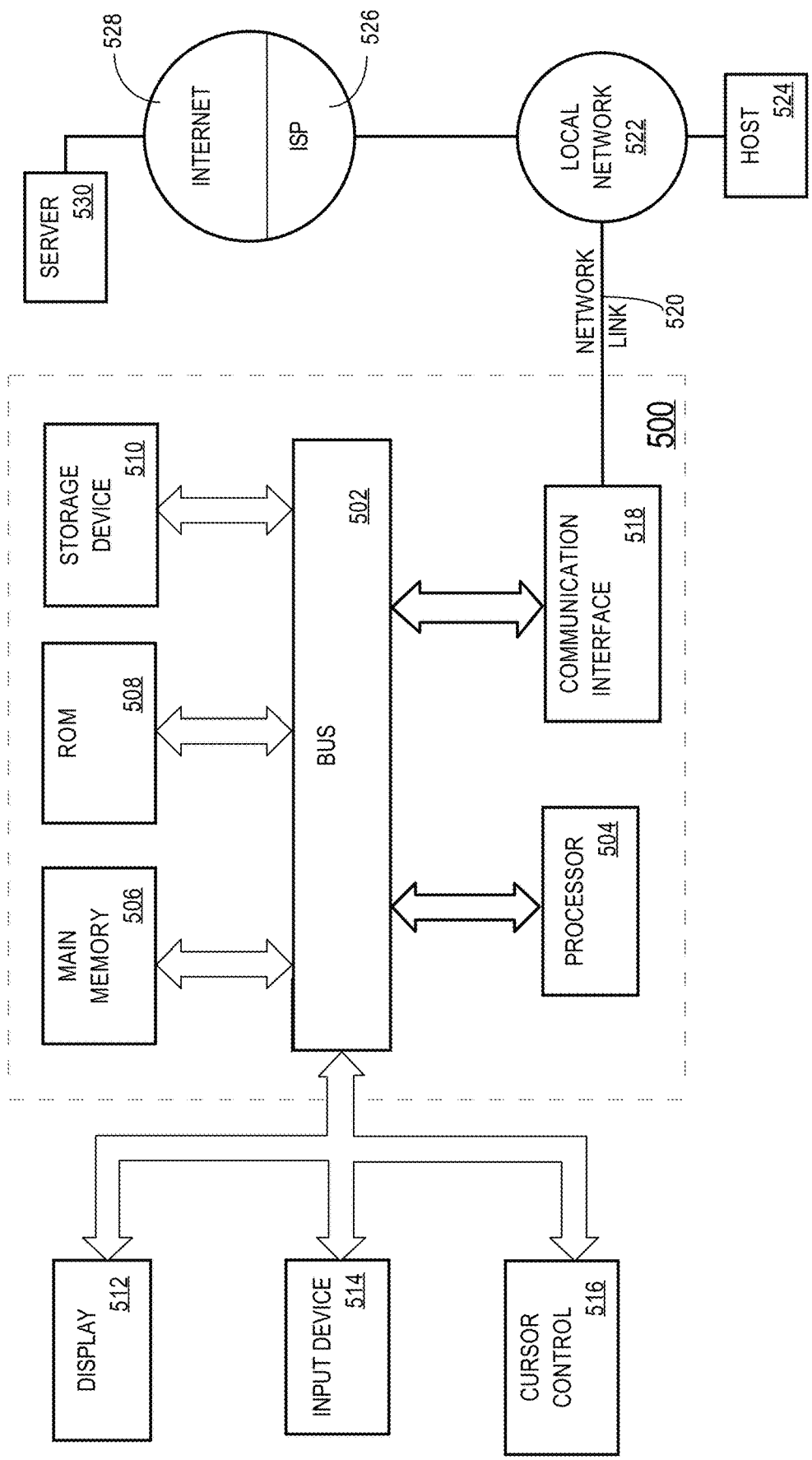
FIG. 5 is a block diagram that illustrates a computer system upon which an embodiment of the approach may be implemented.

For example, FIG. 5 is a block diagram that illustrates a computer system 500 upon which an embodiment of the approach may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing Overview

The techniques described herein are implemented using one or more processing solutions, examples of which include distributed systems, clustered computing systems, and cloud computing systems. In an embodiment, a DBMS and/or a cluster of nodes may be part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to the DBMS and the cluster of nodes, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for executing a query to compute a plurality of functions on a plurality of rows, wherein the query specifies a first function indicating a first measure column and a second function indicating a second measure column, the executing of the query comprising:
   appending a first prefix to a first plurality of values of the plurality of rows in the first measure column indicated by the first function of the plurality of functions;
   appending a second prefix to a second plurality of values of the plurality of rows in the second measure column indicated by the second function of the plurality of functions;
   performing a single sort operation on a prefixed set of values that includes both the first plurality of values appended with the first prefix and the second plurality of values appended with the second prefix to together sort both the first plurality of values and the second plurality of values thereby generating a sorted set of prefixed values;
   using the sorted set of prefixed values, computing the first function specifying the first measure column and the second function specifying the second measure column;
   wherein the method is performed by one or more computing devices.

2. The method of claim 1, further comprising:
   after the single sort operation, identifying, based on the first prefix, a sorted set of the first plurality of values in the sorted set of prefixed values;
   based on the sorted set of the first plurality of values of the first measure column, computing the first function specifying the first measure column.

3. The method of claim 1, further comprising:
   after the single sort operation, identifying, based on the second prefix, a sorted set of the second plurality of values in the sorted set of prefixed values;
   based on the sorted set of the second plurality of values of the second measure column, computing the second function specifying the second measure column.

4. The method of claim 1, wherein the first measure column of the first function and the second measure column of the second function are the same column of the plurality of rows.

5. The method of claim 1, wherein the first function is an inverse distribution function and the second function is a distinct aggregate function.

6. The method of claim 1, wherein the first function is a distinct aggregate function and the method further comprises:
   after the single sort operation, identifying, based on the first prefix, a sorted set of the first plurality of values in the sorted set of prefixed values;
   removing duplicate values from the sorted set of the first plurality of values.

7. The method of claim 1, further comprising:
   distributing the plurality of rows to a plurality of processes at least by:
      distributing values in the first measure column of the plurality of rows using a first distribution methodology, and
      distributing values in the second measure column of the plurality of rows using a second distribution methodology;
   wherein the first distribution methodology is different from the second distribution methodology.

8. The method of claim 7, wherein the first distribution methodology is a value range-based distribution and the second distribution methodology is a hash-based distribution.

9. The method of claim 1, wherein appending the first prefix to the first plurality of values of the plurality of rows in the first measure column further comprises:
   duplicating each row of the plurality of rows to create a respective duplicate row; and
   generating a prefixed measure value by appending the first prefix to a value of the first measure column at said each row;
   appending a new column containing the prefixed measure value to said respective duplicate row.

10. The method of claim 1, further comprising:
    receiving, at a particular process of a plurality of processes, the first plurality of values appended with the first prefix corresponding to the first measure column;
    receiving, at the particular process of the plurality of processes, the second plurality of values appended with the second prefix corresponding to the second measure column;
    storing in a memory buffer, by the particular process, a set of buffer values that includes the first plurality of values appended with the first prefix and the second plurality of values appended with the second prefix;
    performing the single sort operation by performing a sort operation on the stored buffer values in the memory buffer.

11. One or more non-transitory computer-readable storage media storing a set of instructions, wherein the set of instructions includes instructions, which, when executed by one or more hardware processors, cause:
    executing a query to compute a plurality of functions on a plurality of rows, wherein the query specifies a first function indicating a first measure column and a second function indicating a second measure column, the executing of the query comprising:
       appending a first prefix to a first plurality of values of the plurality of rows in the first measure column indicated by the first function of the plurality of functions;
       appending a second prefix to a second plurality of values of the plurality of rows in the second measure column indicated by the second function of the plurality of functions;
       performing a single sort operation on a prefixed set of values that includes both the first plurality of values appended with the first prefix and the second plurality of values appended with the second prefix to together sort both the first plurality of values and the second plurality of values thereby generating a sorted set of prefixed values;
       using the sorted set of prefixed values, computing the first function specifying the first measure column and the second function specifying the second measure column.

12. The one or more non-transitory computer-readable storage media of claim 11, wherein the set of instructions includes further instructions, which, when executed on the one or more hardware processors, cause:
    after the single sort operation, identifying, based on the first prefix, a sorted set of the first plurality of values in the sorted set of prefixed values;
    based on the sorted set of the first plurality of values of the first measure column, computing the first function specifying the first measure column.

13. The one or more non-transitory computer-readable storage media of claim 11, wherein the set of instructions includes further instructions, which, when executed on the one or more hardware processors, cause:

after the single sort operation, identifying, based on the second prefix, a sorted set of the second plurality of values in the sorted set of prefixed values;

based on the sorted set of the second plurality of values of the second measure column, computing the second function specifying the second measure column.

14. The one or more non-transitory computer-readable storage media of claim 11, wherein the first measure column of the first function and the second measure column of the second function are the same column of the plurality of rows.

15. The one or more non-transitory computer-readable storage media of claim 11, wherein the first function is an inverse distribution function and the second function is a distinct aggregate function.

16. The one or more non-transitory computer-readable storage media of claim 11, wherein the first function is a distinct aggregate function, and wherein the set of instructions includes further instructions, which, when executed on the one or more hardware processors, cause:

after the single sort operation, identifying, based on the first prefix, a sorted set of the first plurality of values in the sorted set of prefixed values;

removing duplicate values from the sorted set of the first plurality of values.

17. The one or more non-transitory computer-readable storage media of claim 11, wherein the set of instructions includes further instructions, which, when executed on the one or more hardware processors, cause:

distributing the plurality of rows to a plurality of processes at least by:

distributing values in the first measure column of the plurality of rows using a first distribution methodology, and distributing values in the second measure column of the plurality of rows using a second distribution methodology;

wherein the first distribution methodology is different from the second distribution methodology.

18. The one or more non-transitory computer-readable storage media of claim 17, wherein the first distribution methodology is a value range-based distribution and the second distribution methodology is a hash-based distribution.

19. The one or more non-transitory computer-readable storage media of claim 11, wherein the set of instructions includes further instructions, which, when executed on the one or more hardware processors, cause:

duplicating each row of the plurality of rows to create a respective duplicate row; and generating a prefixed measure value by appending the first prefix to a value of the first measure column at said each row;

appending a new column containing the prefixed measure value to said respective duplicate row.

20. The one or more non-transitory computer-readable storage media of claim 11, wherein the set of instructions includes further instructions, which, when executed on the one or more hardware processors, cause:

receiving, at a particular process of a plurality of processes, the first plurality of values appended with the first prefix corresponding to the first measure column;

receiving, at the particular process of the plurality of processes, the second plurality of values appended with the second prefix corresponding to the second measure column;

storing in a memory buffer, by the particular process, a set of buffer values that includes the first plurality of values appended with the first prefix and the second plurality of values appended with the second prefix;

performing the single sort operation by performing a sort operation on the stored buffer values in the memory buffer.

* * * * *